Figure 4:
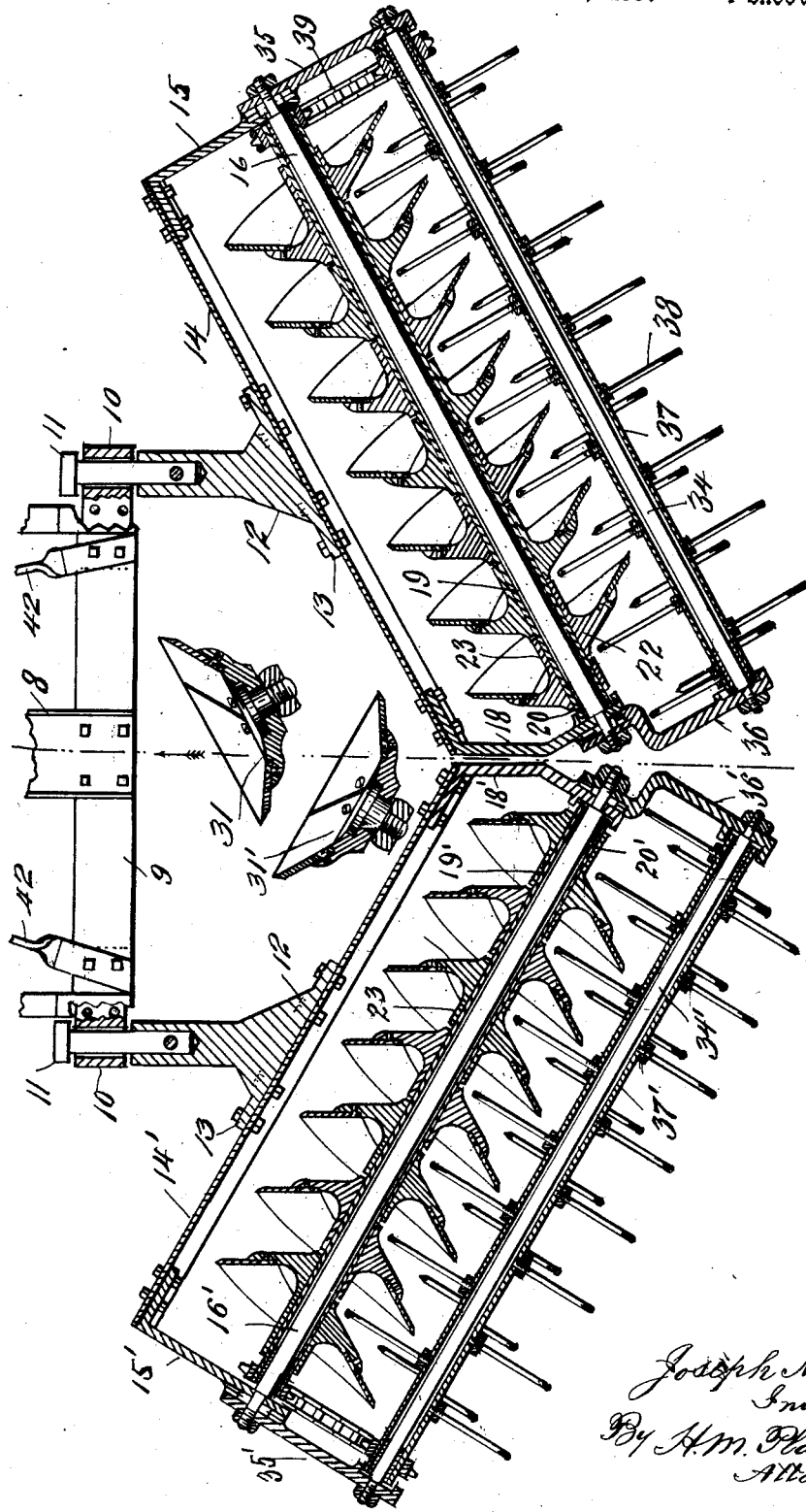

Dec. 15, 1931.  J. N. NEWSOM  1,836,984
PLOW
Filed March 20, 1930   4 Sheets-Sheet 1
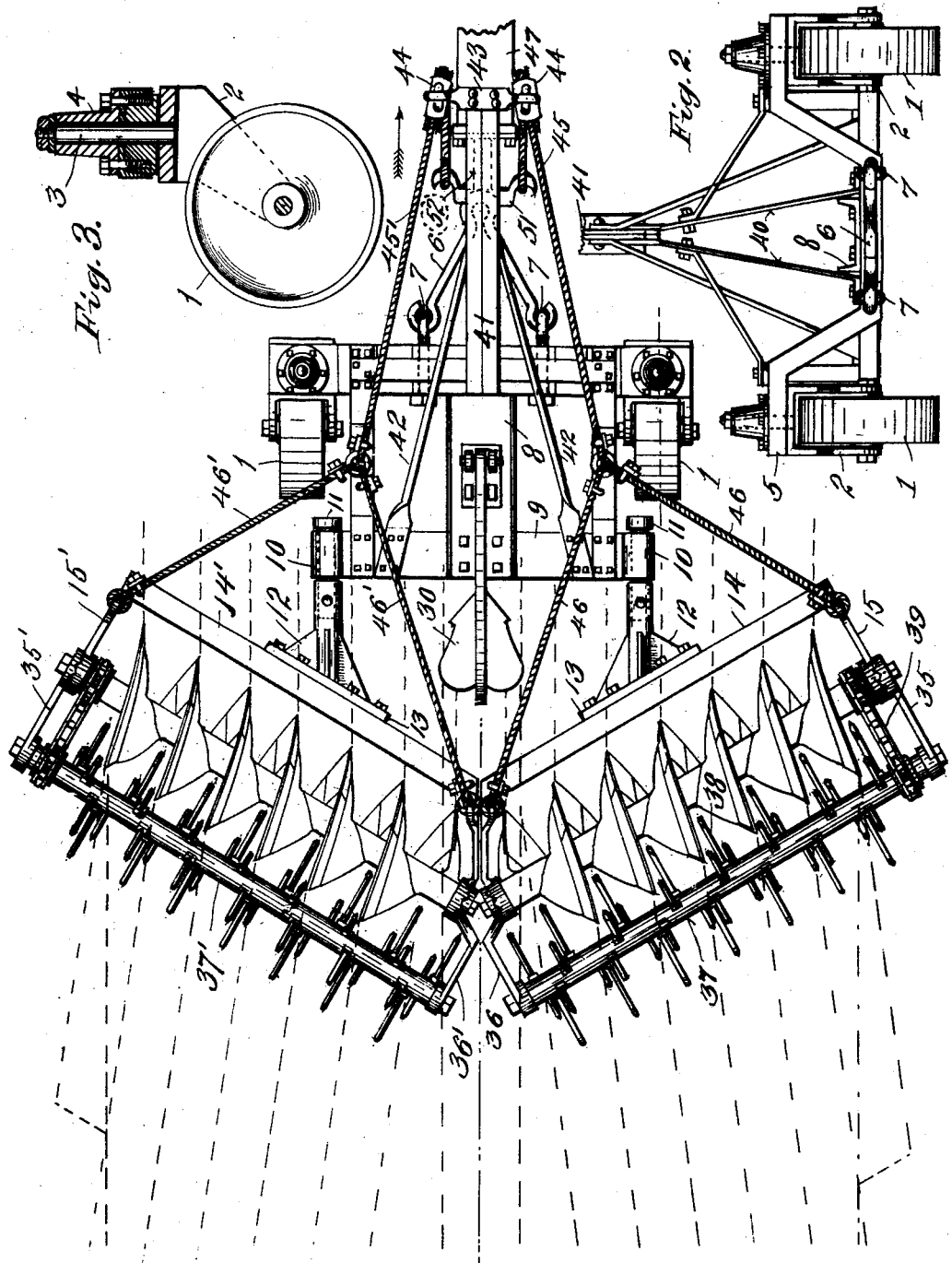
Joseph N. Newsom
Inventor
By H. M. Plaisted
Attorney Dec. 15, 1931.  J. N. NEWSOM  1,836,984
PLOW
Filed March 20, 1930  4 Sheets-Sheet 2

Joseph N. Newsom
Inventor;
By H. M. Plaisted
Attorney.

Dec. 15, 1931.  J. N. NEWSOM  1,836,984
PLOW
Filed March 20, 1930  4 Sheets-Sheet 3
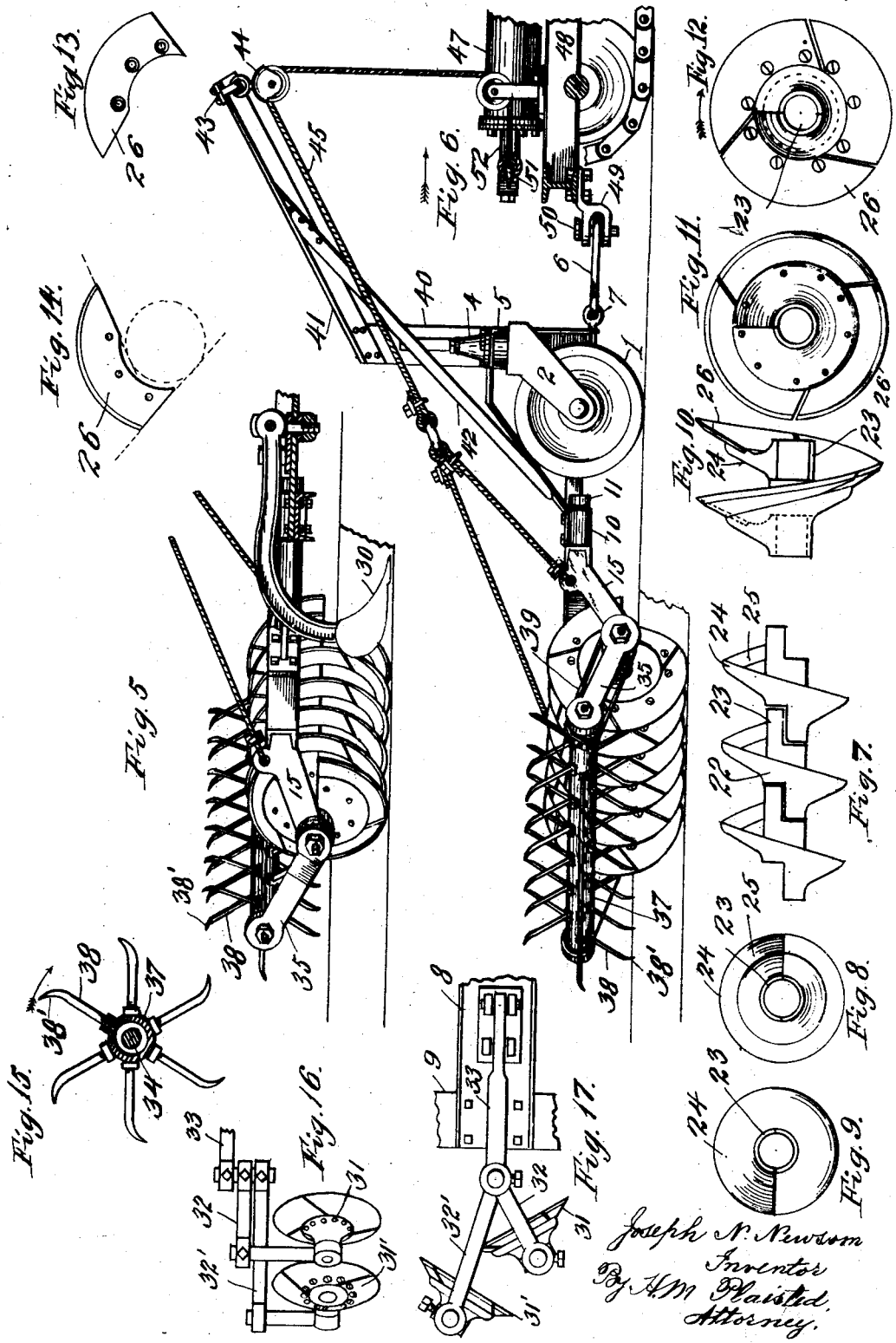

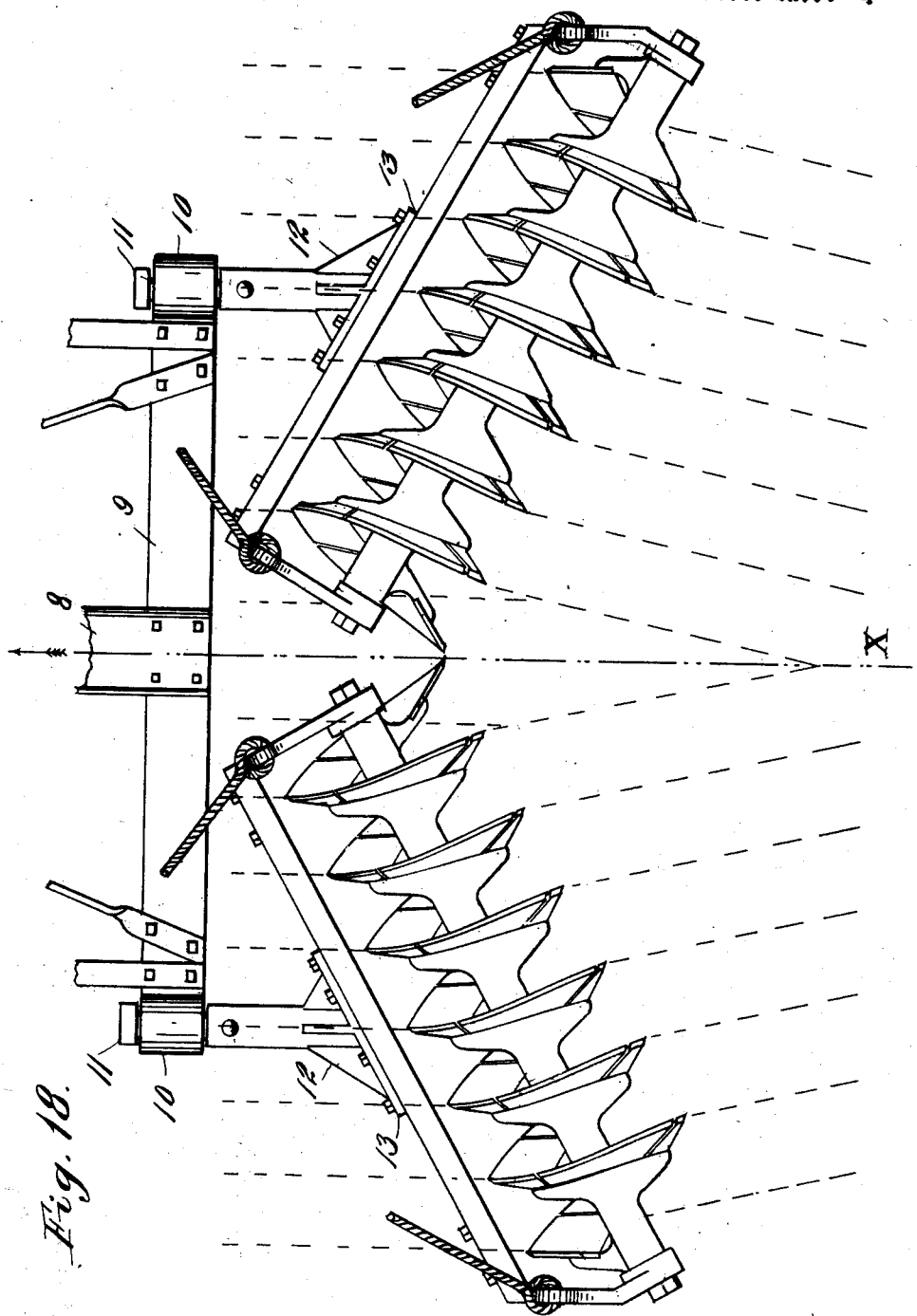

Patented Dec. 15, 1931

1,836,984

UNITED STATES PATENT OFFICE

JOSEPH N. NEWSOM, OF ST. LOUIS, MISSOURI

PLOW

Application filed March 20, 1930. Serial No. 437,386.

This invention relates to certain new and useful improvements in plows, the peculiarities of which will be hereinafter fully described and claimed.

The main objects of my invention are to provide a plow of comparatively light draft relative to the width of operation, facilitating increased speed of travel and consequently larger area of ground plowed; secondly, to provide helicoidal blades in plow sections inclined to the line of draft that oppose each other's lateral tendency while entering the ground to operative depth, or when one section temporarily rises; thirdly, to dispose said helicoidal blades of suitable pitch so as to effect a primary cutting action substantially parallel at operative depth to the axis of draft, and then effect a lateral thrust on the cut furrow as the blade is leaving the ground; fourthly, to provide for replacing any portion of said helicoidal blades; fifthly, to provide interlocking units of said blades and their supporting hubs; sixthly, to provide a joint between the blades of said units that tends to clear itself from intercepted trash; seventhly, to provide rotatable means for cleaning said blades from adhering soil and trash; eighthly, to raise the blades from ground contact and support them in such inoperative position for transportation from place to place; and ninthly, to provide other features of novelty and arrangement hereinafter described and claimed.

In the accompanying drawings in which like reference numerals indicate corresponding parts, Fig. 1 represents a plan view of a plow exemplifying my invention;

Fig. 2, a front elevation of supporting caster wheels, their yoke and adjacent parts;

Fig. 3, a side elevation of a caster wheel with its mounting on the yoke shown in section;

Fig. 4, a sectional plan view taken on a horizontal central plane through the two sections of helicoidal blades and adjacent parts;

Fig. 5, a side elevation of the plow section and adjacent parts at the left of the draft axis X of Fig. 1;

Fig. 6, a similar view of the right hand plow section and adjacent parts looking in the same direction;

Fig. 7, a detail side view of several interlocking hubs;

Fig. 8, a detail end view of the convex face of said hubs;

Fig. 9, a similar view of the concave face;

Fig. 10, a detail side view of a hub and its blade mounted thereon forming one unit;

Fig. 11, a detail end view of the convex face of Fig. 10;

Fig. 12, a similar view of the concave face;

Fig. 13, a detail front view of a blade segment;

Fig. 14, a similar rear view;

Fig. 15, a detail sectional view across the shaft of my rotary comb;

Fig. 16, a side elevation of filler discs as mounted in the draft axis;

Fig. 17, a plan view of the same; and

Fig. 18, a plan view of another arrangement of my helicoidal bladed plow sections.

Referring to the drawings, 1—1 designates supporting carrying wheels preferably two caster wheels pivotally mounted in bracket arms 2 having a vertical stud shaft 3 pivotally mounted in a suitable bearing 4 at the respective ends of a connecting yoke 5 preferably of the drop yoke style in order to bring a draft link 6 substantially in the horizontal plane through the axes of said wheels. This link is preferably of V-shape loosely connected to spaced eyes 7 in said yoke and having its front end as a single eye for coupling to a tractor or other draft means as indicated in Fig. 6.

A longitudinal draft beam 8 in the draft axis X Fig. 1, extends rearward from said yoke and has a cross beam head 9 provided with strap eyes 10, the axes of which are substantially parallel to the axis X. In these eyes are loosely mounted short shafts having heads 11 and detachably connected to brackets 12 at their rear ends as shown in Fig. 1. These draft brackets have flanged heads 13 inclined to the axis X and to each other, and allow tilting of each length on a longitudinal axis through each bracket and parallel to the draft axis X. To these heads are securely fastened respective plow beams 14—14' likewise inclined to each other and to said axis X. The longitudinal mounting of the bracket shafts in the strap eyes above mentioned, allows an up and down movement of the ends of these beams in which are mounted plowing devices, and compensate for irregular ground surface.

The outer ends of the respective plow beams 14 and 14' are provided with rearward extending arms 15—15', having heads adapted for supporting the outer ends of shafts 16 at the right and 16' at the left, as viewed when facing forward in the direction of draft as indicated by the arrow Figs. 1 and 4. The other ends of said plow beams are provided with arms 18—18' closely adjacent to the draft axis and having heads adapted to support the inner ends of the respective shafts 16—16'.

The said shafts for the right and left hand plow sections are preferably non-rotatable as supported in the heads of the plow beam arms. On these shafts are respectively mounted pipes 19—19', somewhat larger than the said shafts in order to provide a chamber for storage of oil to lubricate bearings at the ends of said pipes which are preferably formed by bushings 20—20' near the ends of the center shafts.

On the rotary pipes are mounted multiple hubs 22 consisting of cylindrical portions 23, halved or otherwise adapted to interlock adjacent hubs, and provided with spiral flaring portions 24, convex at the rear and concave in front. The front near the edge has a recess 25 adapted to receive a segment of helicoidal spiral plate 26. A connected series of said hubs and their plates constituting interlocking units as mounted on said pipes, form a continuous helicoidal bladed plow section at the right and left respectively of said draft axis.

Each spiral blade is made preferably of three segments for the hub on which they are mounted as shown in Figs. 10-12. They are beveled on the back face at the edge as shown in Fig. 10 and the inner edge fits in said recess 25 so that the blade is flush with the adjacent portion of the hub. The joints between adjacent sections are inclined backward relative to the direction of rotation, so that trash endeavoring to enter the joints will tend to be cleared therefrom as the blades pass through the ground. These segments are fastened to the hubs by countersunk screws or other detachable fastenings to provide for ready removal and replacement of any section.

Figs. 13 and 14 show detail views of front and back faces respectively of a segment of cutting blades. It will be noted that the joint edges are substantially tangent to a circle indicated by dotted lines Fig. 14. The face of the segment has countersunk holes for the fastening screws to preserve the flush surfaces at the concave front when mounted to form a helicoidal plowing device.

Referring now to Fig. 4, representing a sectional plan view on the horizontal central plane through said helicoidal devices, it will be noted that the front portions of the blades intersected by said plane, extend forward in lines substantially parallel to the axis X. These portions are at or near the surface of the ground when the plow is at its operating depth, and therefore these front parallel portions will cut straight ahead as the tractor or other draft means hauls the plow forward in the direction of the arrow. Such disposed position of the front portions of the helicoidal blades, causes them to cut like parallel spades in their primary cutting action at and near the surface of the ground. As such portions rotate downward to the bottom of the cut, and then rise to the rear, these portions change their position from parallel to the axis X to a transverse position. Thus the furrow that is cut by the primary action of the front portion directed straight ahead at and near the surface, is thrust laterally by the same blade portion as it rotates upward to the wheel. This lateral thrust turns over and pulverizes the soil.

The dashed lines in Fig. 1 towards the front indicate these parallel primary positions of the forward portions of the blades; the dashed lines to the rear of the blades indicate the lateral tendency of the earth as the said portions rise to the rear and exert the lateral thrust thereon.

Referring to Fig. 4, it will be noted that the front portions and the rear portions are both substantially 60 degrees inclined to the rotary axis. Also that this inclination disposes the front portion parallel to the axis X, which portion as it rotates downward changes till when it reaches the rear and rises, it is transverse to the axis X. Such change of position as the successive front portions turn downward and then upward, making a half circle, changes the straight primary cutting action into a lateral thrust upon the cut furrow as the blade leaves it behind.

The left hand helicoidal plow device of Fig. 1 has therefore a right hand screw. The right hand plow device has a left hand screw. When the blades are rolling on top of the ground before entering, each screw has a tendency to work toward the axis X. This double arrangement of the right and left hand helicoids therefore causes them to oppose each other in this tendency. Soon, however, as they dig into the ground till the surface is substantially even with the hub, this tendency to crawl is practically eliminated, due to the parallel location of the respective forward portions of the helicoid in operating position and depth.

Furthermore, the draft necessary for translation of the plow forward along the axis X is greatly reduced by my construction shown and described as compared with any other plow of the disc or common plow variety. Therefore a greater speed is attainable, in fact double the usual speed, so that practically double the area of the ground can be plowed with my device as compared with other forms of plowing devices. In the axis X 1 prefer to locate in front of the inner ends of the plow sections, a common plow share 30 to fill in the space between the adjacent inner ends of my helicoidal plow sections. Instead of this form of plow I may use a couple of discs 31 and 31' opposed to each other as shown in Fig. 4, and mounted on suitable beam connections 32—32' respectively connected to a draft beam 33 (Fig. 17) pivotally mounted on the longitudinal beam 8 (Figs. 1 and 17). These discs are preferably in segments with joints inclined backward in respect to the direction of rotation, in order to clear the joints from trash the same as in the helicoidal blades above described.

In order to clear the helicoidal blades from soil and trash that adhere to them I provide a rotary comb for each plow section preferably comprising non-rotatable shafts 34—34' mounted in adjustable arms 35—35' respectively mounted on the arms 15 and 15'. The inner plow beam arms have similar adjustable arms 36 and 36' for supporting the inner ends of the comb shafts 34 and 34'. The engagement of the respective brackets are adjustable by forming the meeting faces of their heads with serrations as shown in Figs. 1 and 4, or otherwise adapted to allow adjustment of the comb shafts with regard to the ground. On these comb shafts are mounted pipes 37—37' having bushing bearings on the non-rotatable center shafts similar to the plow section pipes by preference and forming a similar oil storage chamber for said bearings. In these pipes are mounted by threaded ends and jamb nuts or otherwise, radially disposed rods 38 (Fig. 15) forming fingers that are arranged spirally on the same pitch practically as that of the helicoidal plow sections respectively. The ends 38' of said fingers are preferably inclined backward relative to their rotation to clear themselves from trash intercepted in the spaces between the helicoidal blades, in which spaces they operate as shown in Figs. 1 and 4.

They are respectively rotated by means of sprocket wheels and sprocket chains 39 operatively connecting them with the adjacent helicoidal bladed sections as shown in Figs. 1 and 4. These combs will thus rotate in the same direction and speed as the helicoidal bladed sections, but the fingers will travel downward adjacent to the rear portions of the blades rising from the ground. Thus the trash or adhering soil will be scraped from the rear portions of the blades by these fingers.

In order to raise the helicoidal bladed sections out of ground contact, I provide a derrick preferably consisting of a post formed of two vertically disposed wide bars 40 secured to the center portions of the yoke at each side of the draft beam 8 and inclined towards each other at the top where they are secured to a derrick arm 41 inclined upward and forward and provided with suitable ties 42 extending rearward to the cross beam 9. A head 43 at the upper end of said arm supports a pair of pulley blocks 44 over which pass cables 45 and 45' to the rear at each side for respective connection to the plow beams by means of divided cables 46—46', the ends of which are fastened to the ends of the respective plow beams at their arms or other suitable places. The forward ends of said cables 45 and 45' are connected to any suitable hoisting device, preferably a cylinder 47 carried by a suitable tractor 48 having a draft head 49 connected by a pin 50 with the forward end of said draft link 6. Such a hoist commonly operated by oil under pressure of a pump, or air pressure, has a yoke 51 at the end of its piston rod 52 (Fig. 6) for connection with the respective cables 45—45'. A downward pull on said cables by said hoist or other suitable means will tilt the yoke about the axes of the carrying wheels on account of the elevated position of said pulleys 44. This tilting of the yoke and derrick fastened thereon, will be carried by the ties 42 to the cross beam 9 and the plow beams and helicoidal blades connected thereto as above described. The helicoidal bladed sections will therefore be raised from ground contact and supported in such inoperative position while the hoisting cables are under tension as above described. Transportation of my plow on the carrying wheels is readily effected by said tractor, a portion of which only is shown in Fig. 6 for illustration. Other suitable means for raising the helicoidal blades from ground contact may be employed.

Referring to Fig. 18, an arrangement of my helicoidal bladed plow sections is shown by which the plowed earth is thrown inward toward the draft axis, instead of outward as indicated by Fig. 1. This arrangement is made simply by changing the sections shown in Fig. 1 to the opposite side respectively of the draft axis. The parallel forward cutting action of the forward portions of the blades is the same in Fig. 18 as in Fig. 1, but this disposition of the said sections allows the ends to be brought nearer to the center line or draft axis in Fig. 18, than they are in Fig. 1. In some soil and form of weeds, this arrangement of Fig. 18 is preferable. The surface of the plowed ground left by my helicoidal blades shows no perceptible cleavage or division of furrows as the comparatively high speed of travel attainable by my plow tends to pulverize the soil and to turn under practically all trash and weeds unless present in a greater quantity.

Furthermore, the blades described are self-sharpening, because the bevel edge at the back or convex face of the helicoidal blade is next to the firm soil in the primary cutting action of the forward portions above described. This abrasive action upon the convex surfaces, tends to wear the back bevel and sharpen the edge, while on the contrary the concave face operates against the loosened soil. The initial cut near the surface of the ground is where the abrasive action is greatest. As above mentioned, the tendency to crawl when the blades are on top of the ground disappears when they are operating at working depth. During such operation, should they meet a hard portion of soil or other obstruction that would tend to raise one section more or less and cause said sideway tendency of that section, the other section operating at working depth would resist it till the obstruction was passed and the raised section had dug down again to its operative depth. Should both sections rise due to such obstruction, the arrangement and construction above described would operate to overcome any tendency of my plow as a whole to travel sideways, and when such hard portion of the soil is passed the blades would automatically dig in again to their working depth as above described.

I claim:

1. A plow comprising two lengths of helicoidal blades operatively mounted to rotate on axes inclined to each other and to the draft axis and each length tiltable independently on a longitudinal axis, substantially as described.

2. A plow comprising two lengths of helicoidal blades operatively mounted to rotate on horizontally disposed axes inclined to each other and to the draft axis, and each length having a rotatable draft connection parallel to the longitudinal draft axis and mounted between its ends to afford tilting of said length on said longitudinal axis, the pitch of said blades providing a primary cutting action from the front downward, substantially as described.

3. A plow comprising two lengths of helicoidal blades operatively mounted to rotate on horizontally disposed axes inclined to each other and to the draft axis, and having rotatable draft means intermediate of their ends on axes parallel to the central draft axis allowing of tilting independently on said longitudinal axes through the draft means, the pitch of said blades forming forward operative portions near the ground surface that are substantially parallel to the draft axis and providing a primary forward cutting action from the front downward, substantially as described.

4. A plow comprising two lengths of helicoidal blades operatively mounted to rotate on horizontally disposed axes inclined to each other and to the draft axis, and each having a draft bracket intermediate of its ends provided with a shaft loosely mounted in a strap eye adapted to tiltably rotate on an axis parallel to the draft axis, the pitch of said blades forming forward operative portions near the ground surface that are substantially parallel to the draft axis and become transverse rearward as they rotate and provide a forward cutting action from the front downward that changes to lateral thrust as said portions rise rearward, substantially as described.

5. A plow comprising a length of helicoidal blades operatively mounted on a horizontally disposed axis and having removable unit portions interlocking with each other, substantially as described.

6. A plow comprising a length of helicoidal blades operatively mounted to rotate and travel on a horizontally disposed axis and having removable unit portions provided with joints inclined rotatively backward, substantially as described.

7. A plow comprising a length of helicoidal blades operatively mounted to rotate and travel on a horizontally disposed axis and having removable unit portions consisting of interlocking hubs and segments of spiral blades with joints inclined rotatively backward, substantially as described.

8. A plow comprising a length of helicoidal blades operatively mounted to rotate and travel on a horizontally disposed axis and having removable unit portions consisting of interlocking hubs and segments of spiral blades having their edges beveled on their convex face and having joints inclined rotatively backward, substantially as described.

9. A plow comprising a length of helicoidal plow section operatively mounted to rotate on a horizontally disposed axis and consisting of a non-rotating shaft, supporting pipe having bearings and rotatably enclosing said shaft, and multiple interlocking hubs and helicoidal blade segments removable mounted on said supporting pipe, substantially as described.

10. A plow comprising a rotatable helicoidal plow section, and a rotary comb operatively mounted adjacent thereto comprising a rotary shaft having fingers spirally arranged thereon of substantially the same pitch as said plow section and adapted to operate between the blades thereof, substantially as described.

11. A plow comprising a rotatable helicoidal bladed plow section, and a rotary comb operatively mounted adjacent thereto comprising a rotary shaft having radial fingers spirally mounted thereon of substantially the same pitch as said plow section and inclined rotatively backward and adapted to operate in the spiral spaces between the blades of said section, substantially as described.

12. A plow comprising a rotatable helicoidal bladed plow section, a rotary comb operatively mounted adjacent thereto comprising a rotary shaft having radial fingers spirally arranged thereon of substantially the same pitch as said plow section and adapted to operate between the blades thereof, adjustable arms supporting said shaft, and driving means for said comb operatively connecting it with said plow section to rotate at the same speed, substantially as described.

13. A plow comprising a rotatable helicoidal bladed plow section, beam arms operatively supporting said plow section, comb-supporting arms adjustably mounted on said beam arms, a non-rotatable shaft mounted in said comb-supporting arms, a rotary pipe enclosing said shaft and having bearings, radial rods forming fingers spirally mounted on said pipe in substantially the same pitch as the plow section and adapted to extend adjacent thereto, and operative connections between said comb and plow section adapted to drive them at the same speed, substantially as described.

14. A plow comprising a rotatable helicoidal bladed plow section, beam arms operatively supporting said plow section, comb-supporting arms adjustably mounted on said beam arms, a rotary pipe enclosing said shaft and having bearings on said shaft adapted to be lubricated by oil contained in said pipe, rods forming fingers spirally mounted on said pipe and adapted to coincide with the spiral spaces of said plow section, and sprocket chain and wheels operatively connecting said plow section and rotary comb, substantially as described.

15. A plow comprising caster carrying wheels, a connecting yoke in front of the axis of said wheels, plow beams and plowing devices connected to said yoke by draft brackets intermediate of the beam ends and rotatable on axes parallel to the central draft axis, a derrick on said yoke in front of said axis, and cable connection from said plow beams through said derrick, substantially as described.

16. A plow comprising caster carrying wheels, a connecting yoke in front of the axis of said wheels and tiltable about the axis of said wheels, plow beams and plowing devices connected to said yoke, by horizontal rotatable draft connections from the center of said beams to allow tilting of said beams independently on longitudinal axes parallel to the draft axis, a derrick on said yoke, having its weight acting in front of said axis, and cable connection between said derrick and plow beams, substantially as described.

17. A plow comprising a rotary cutting blade operatively mounted to rotate and travel transversely to a horizontally disposed axis and having removable cutting portions provided with joints inclined rotatively backward.

In testimony whereof I have affixed my signature.

JOSEPH N. NEWSOM.